(12) United States Patent
Adachi et al.

(10) Patent No.: US 11,692,929 B2
(45) Date of Patent: Jul. 4, 2023

(54) AUTOMATIC ANALYZER AND STANDARD SOLUTION FOR EVALUATING SCATTERED LIGHT MEASUREMENT OPTICAL SYSTEM THEREOF

(71) Applicant: Hitachi High-Technologies Corporation, Tokyo (JP)

(72) Inventors: Sakuichiro Adachi, Tokyo (JP); Masahiko Iijima, Tokyo (JP); Yuto Kazama, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 359 days.

(21) Appl. No.: 16/070,306

(22) PCT Filed: Nov. 28, 2016

(86) PCT No.: PCT/JP2016/085133
§ 371 (c)(1),
(2) Date: Jul. 16, 2018

(87) PCT Pub. No.: WO2017/126227
PCT Pub. Date: Jul. 27, 2017

(65) Prior Publication Data
US 2019/0025192 A1  Jan. 24, 2019

(30) Foreign Application Priority Data

Jan. 22, 2016 (JP) .............................. JP2016-010786

(51) Int. Cl.
*G01N 21/47* (2006.01)
*G01N 33/543* (2006.01)
(Continued)

(52) U.S. Cl.
CPC ............ *G01N 21/0332* (2013.01); *B01L 3/50* (2013.01); *G01N 15/1012* (2013.01);
(Continued)

(58) Field of Classification Search
None
See application file for complete search history.

(56) References Cited

U.S. PATENT DOCUMENTS

| 4,451,433 A | 5/1984 | Yamashita et al. |
| 5,100,805 A * | 3/1992 | Ziege ..................... G01N 21/82 422/527 |

(Continued)

FOREIGN PATENT DOCUMENTS

| EP | 1 072 887 A2 | 1/2001 |
| EP | 2 453 224 A1 | 5/2012 |

(Continued)

OTHER PUBLICATIONS

Extended European Search Report issued in counterpart European Application No. 16886466.8 dated Jul. 23, 2019 (eight (8) pages).

(Continued)

*Primary Examiner* — Neil N Turk
(74) *Attorney, Agent, or Firm* — Crowell & Moring LLP (57) ABSTRACT

As a standard solution for evaluating a scattered light measuring optical system mounted on an automated analyzer, a standard solution containing an insoluble carrier at a concentration, at which transmittance is in a range of 10% to 50%, is used, and a light quantity of a light source is adjusted such that a scattered light detector outputs a predetermined value.

3 Claims, 9 Drawing Sheets

(51) Int. Cl.
  *G01N 21/27* (2006.01)
  *G01N 21/25* (2006.01)
  *G01N 15/10* (2006.01)
  *B01L 3/00* (2006.01)
  *G01N 21/03* (2006.01)
  *G01N 21/49* (2006.01)
  *G01N 35/00* (2006.01)

(52) U.S. Cl.
  CPC ............ *G01N 21/03* (2013.01); *G01N 21/27* (2013.01); *G01N 21/274* (2013.01); *G01N 21/49* (2013.01); *G01N 35/00* (2013.01); *G01N 35/00584* (2013.01)

(56) References Cited

U.S. PATENT DOCUMENTS

| | | | |
|---|---|---|---|
| 5,123,738 | A | 6/1992 | Yonemura |
| 6,762,054 | B2 * | 7/2004 | Kawamura ............ G01N 21/82 422/82.05 |
| 2004/0246501 | A1 | 12/2004 | Curtis |
| 2011/0294228 | A1 * | 12/2011 | Bowsher .......... G01N 33/54366 436/501 |
| 2012/0141330 | A1 | 6/2012 | Adachi et al. |
| 2014/0220705 | A1 * | 8/2014 | Yogi ................ G01N 33/54366 436/501 |
| 2016/0025758 | A1 | 1/2016 | Yogi et al. |
| 2016/0195522 | A1 | 7/2016 | Takahashi et al. |

FOREIGN PATENT DOCUMENTS

| | | |
|---|---|---|
| EP | 2 759 828 A1 | 7/2014 |
| JP | 62-194461 A | 8/1987 |
| JP | 2-87063 A | 3/1990 |
| JP | 2-162242 A | 6/1990 |
| JP | 2002-357610 A | 12/2002 |
| JP | 2003-329551 A | 11/2003 |
| JP | 2005-512085 A | 4/2005 |
| JP | 2013-64705 A | 4/2013 |
| JP | 2013-68443 A | 4/2013 |
| JP | 5318206 B2 | 10/2013 |
| JP | 2014-119425 A | 6/2014 |
| JP | 2014-202523 A | 10/2014 |
| WO | WO 2014/192963 A1 | 12/2014 |

OTHER PUBLICATIONS

International Search Report (PCT/ISA/210) issued in PCT Application No. PCT/JP2016/085133 dated Feb. 21, 2017 with English translation (six pages).

Japanese-language Written Opinion (PCT/ISA/237) issued in PCT Application No. PCT/JP2016/085133 dated Feb. 21, 2017 (four pages).

\* cited by examiner

RELATIONSHIP BETWEEN ABSORBANCE AND TRANSMITTANCE OF SOLUTION IN CELL HAVING OPTICAL LENGTH OF 5 mm

| ABSORBANCE OF SOLUTION (abs, 1 = 10mm) | TRANSMITTANCE OF SOLUTION (%) |
|---:|---:|
| 0.6 | 50.1 |
| 0.8 | 39.8 |
| 0.8686 | 36.8 |
| 1 | 31.6 |
| 1.15 | 26.6 |
| 1.3 | 22.4 |
| 1.5 | 17.8 |
| 2 | 10.0 |

| LED LIGHT QUANTITY ADJUSTING SCREEN | |
|---|---|
| 0° | 12020 |
| 20° | 14010 |
| 30° | 13080 |

Fig. 16

| LIGHT RECEIVING ANGLE | BEFORE ADJUSTMENT OF LIGHT QUANTITY OF LIGHT SOURCE | | AFTER ADJUSTMENT OF LIGHT QUANTITY OF LIGHT SOURCE | |
|---|---|---|---|---|
| | 20° SCATTERING | 30° SCATTERING | 20° SCATTERING | 30° SCATTERING |
| MAX | 8939.1 | 8054.6 | 7032.6 | 6435.2 |
| MIN | 7412.0 | 6685.7 | 6644.9 | 5969.9 |
| RANGE | 1527.1 | 1368.8 | 387.7 | 465.3 |
| MEAN | 8210.1 | 7456.1 | 7481.1 | 6857.6 |
| DEVIATION RATE | 18.6% | 18.4% | 5.2% | 6.8% |

AUTOMATIC ANALYZER AND STANDARD SOLUTION FOR EVALUATING SCATTERED LIGHT MEASUREMENT OPTICAL SYSTEM THEREOF

TECHNICAL FIELD

The present invention relates to an automated analyzer that analyzes an amount of a component contained in a sample such as blood or urine, a standard solution for evaluating scattered light measuring optical system of the automated analyzer, and a method of adjusting the automated analyzer using the standard solution.

BACKGROUND ART

There has been widely used an automated analyzer that radiates light from a light source to a reaction solution obtained by mixing a reagent and an analyte such as serum or urine, that calculates the absorbance from a change in a transmitted light quantity at a specific wavelength, and that quantifies the concentration of a substance to be measured in accordance with a Lambert-Beer law (PTL 1).

As a reaction which is measured by the automated analyzer, there are mainly two types of reactions such as a color reaction from a reaction between a substrate and enzymes and an immune agglutination reaction between an antigen and an antibody. An analysis using the former reaction is referred to as a biochemical analysis, and test items of the analysis are enzymes, lipids, nitrogen compounds, and the like. An analysis using the latter reaction is referred to as an immunoassay, and test items of the analysis are a trace protein (CRP) or a tumor marker, a hormone, a drug in blood, and the like. Among the test items of the immunoassay, there are a test item of which detection is performed with high sensitivity in a low-concentration region or a test item of which a quantitative value is important in a clinical diagnosis. In such test items, a latex immunoturbidimetric assay or the like in which latex particles having an antibody sensitized (bound) to surfaces thereof are used as a sensitizer. In the latex immunoturbidimetric assay, the latex particles contained in a reagent via a substance to be measured in an analyte are aggregated, and a clump is produced.

On the automated analyzer: light radiates to a reaction solution obtained by mixing the analyte and the reagent; a change in the quantity of transmitted light, which is not scattered but transmitted, is measured; and the concentration of the substance to be measured, which is present in the analyte, is quantified. The higher the concentration of the substance to be measured, the larger the light quantity change. In recent years, there has been an increase in measurement needs of immunoassay items, and thus there is a demand for performance improvement in measuring the immunoassay items. Therefore, there has been used a method or the like in which concentration is quantified with high sensitivity by using a light quantity change of scattered light from which it is likely to find larger light quantity change, without using a light quantity change of transmitted light (PTL 2).

CITATION LIST

Patent Literature

PTL 1: U.S. Pat. No. 4,451,433
PTL 2: Japanese Patent No. 5318206

SUMMARY OF INVENTION

Technical Problem

In an automated analyzer, multiple cells are arranged on a circumference, and an analyte and a reagent are caused to react with each other in each of the cells such that the concentration of a substance to be measured in the analyte is quantified. Before the measurement target substance whose concentration is unknown is measured, a measurement target substance whose concentration is well known in advance is measured, and a calibration curve is created by studying a relationship between the concentration of the substance to be measured and the light quantity change. In this manner, it is possible to quantify the concentration of a substance to be measured in an analyte even when there are variations in a scattered light quantity between analyzers. However, in order to manage a state of an analyzer and to detect abnormality, it is desirable that the same scatterer has the same scattered light quantity in any analyzers and any cells. For example, JP-A-2014-119425 discloses that a scattered light quantity is corrected for each cell.

However, a scatterer, which is suitable for evaluating variations in the automated analyzer has not been known. Examples of commercially available scatterers include an opal diffuser panel, crystallized glass, and a solid scatterer using a material based on Teflon (registered trademark). Since the scatterers are solid, a problem arises in that it is difficult to install the scatters at a reaction solution position by using a normal analysis operation on an automated analyzer. In addition, a problem arises in that variations in individual solid scatterers are large. Therefore, it is desirable to use a liquid scatterer.

Since a turbidity standard solution, which is used in a turbidimeter or the like, is a liquid scatterer, it is easy to install the liquid scatterer at a reaction solution position by using a normal analysis operation. In this respect, the liquid scatterer is useful. However, large particles having a grain size of 0.5 µm, 1.0 µm, 2.0 µm, 5.0 µm, and 10.0 µm are mixed in a 100-degree standard solution of a turbidimeter. Therefore, problems arise in that: particles having a grain size of about 0.3 µm, which is used as a latex reagent for an automated analyzer, are not mixed; the particles are deposited as sediment when the solution remains still for a long time; a reagent on the automated analyzer is usually refrigerated, and then, the reagent is warmed up in a thermostat bath (constant at 37° C.) when the reagent is dispensed into a cell, thus dissolved oxygen foams, and bubbles are likely to be generated on a wall surface of the cell. As described above, a scatterer (standard solution) for evaluating an optical system of a light scattering photometer, which is used to measure the light quantity change due to the reaction of the latex reagent for the automated analyzer, is not known.

Solution to Problem

According to the present invention, as a standard solution for evaluating a scattered light measuring optical system of an automated analyzer that has a light source, a cell that contains a reaction solution, and a detector that detects light which radiates from the light source to the cell and is scattered by the reaction solution in the cell, a standard solution is used that contains an insoluble carrier at a concentration at which transmittance is in a range of 10% to 50% when the standard solution is dispensed to the cell. It is more preferable that the standard solution contains an insoluble carrier at a concentration at which transmittance is in a range of 18% to 40% when the standard solution is dispensed to the cell. It is still further preferable that the standard solution contains an insoluble carrier at a concentration at which transmittance is in a range of 22.4% to 31.6% when the standard solution is dispensed to the cell. For example, the cell may have an optical length of 5 mm, and the insoluble carrier may be latex particle having a grain size of 250 to 350 nm.

Advantageous Effects of Invention

According to the present invention, it is possible to reduce an influence of an error in the concentration of the standard solution and to evaluate the entire scattered light measuring optical system including the light source or the detector. In this manner, it is possible to provide a scattered light measuring device having high reliability in a clinical site.

Problems, configurations, and effects other than the problems, configurations, and effects described above are clarified in the following description of embodiments.

DESCRIPTION OF EMBODIMENTS

Hereinafter, embodiments of the present invention will be described with reference to the figures.

Figure 1:
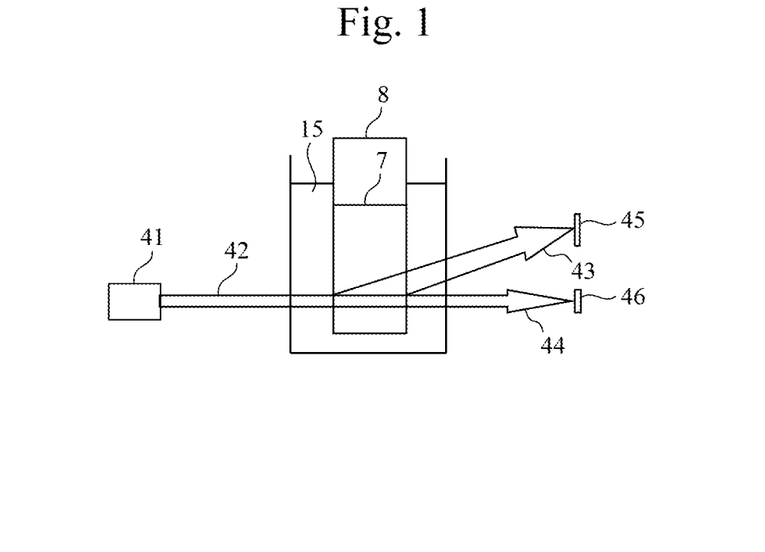
FIG. 1 is a schematic diagram showing an example of a configuration of a light scattering photometer.

FIG. 1 is a schematic diagram showing an example of a configuration of a light scattering photometer that measures the light quantity of scattered light. Light 42 from a light source 41 for measuring the scattered light radiates to a solution 7 in a cell 8 warmed in a constant-temperature fluid 15. Transmitted light 44 is received by a transmitted light receiver 46, and scattered light 43 in a direction at 20° is received by a scattered light receiver 45.

Figure 2:
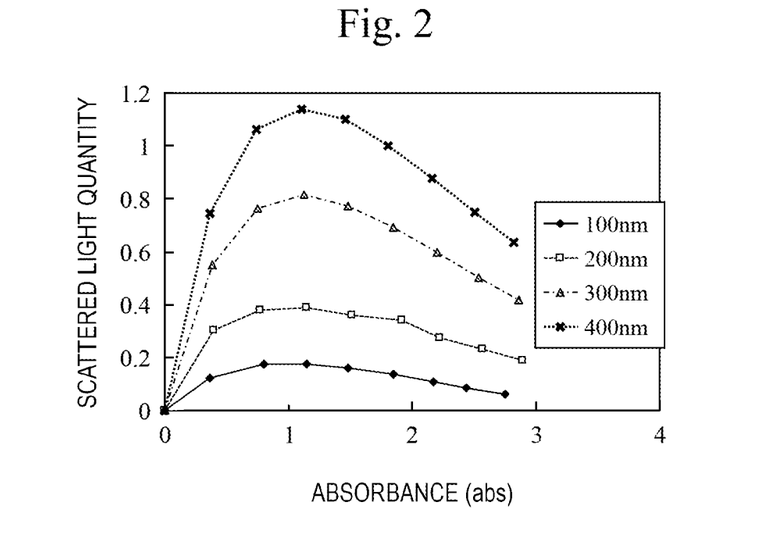
FIG. 2 is a graph showing experimental results indicating absorbance dependence of a scattered light quantity of latex solution.

FIG. 2 is a graph showing experimental results obtained by using a latex solution as the solution 7, changing the concentration, and measuring a scattered light quantity. A cell having an optical length of 5 mm is used as the cell 8 that contains the solution 7. However, in the specification, absorbance of the solution is substituted with absorbance obtained in a case where every absorbance is measured at the optical length of 10 mm. For example, even when the transmittance of a certain solution is 10% in the cell having the optical length of 5 mm, the absorbance of the solution is written as 2.0 abs because the absorbance is substituted with the absorbance obtained in a case where the optical length is 10 mm. Particles having a grain size of 100 nm, 200 nm, 300 nm, and 400 nm are used as the latex particles that are contained in the latex solution. FIG. 2 shows that the maximum scattered light quantity is achieved in the vicinity of 1.15 abs with any grain sizes and, at this time, the scattered light quantity does not significantly change even when the concentration (absorbance) of the particles changes.

Figure 3:
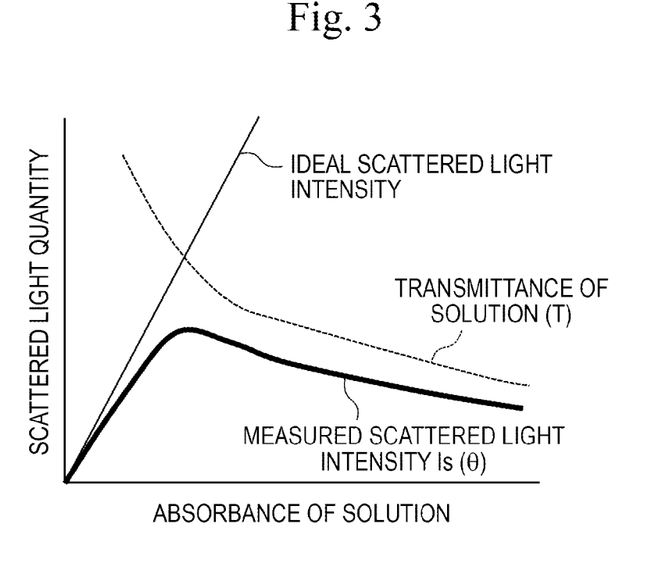
FIG. 3 is a graph showing a tendency of the absorbance dependence of the scattered light quantity.

FIG. 3 is a graph showing a concept of particle concentration dependence of the scattered light quantity. Scattered light (ideal scattered light intensity) that is generated in proportion to the number of particles (absorbance) is increased, however, the scattered light is still further scattered by other particles, and only scattered light in proportion to the transmittance of a solution is transmitted and received by a light receiver. When $I_{ideal}$ represents the ideal scattered light intensity that is measured by a scattered light receiver in a certain direction, and T represents the transmittance of a solution, the scattered light $Is(\theta)$ to be received is expressed by Expression 1.

$$Is(\theta) = I_{ideal} \cdot T \qquad \text{Expression 1}$$

Here, multiple scattering is not considered, and only scattered light scattered once is simply considered to be received. When n represents number density of particles in a solution per unit area, V represents a volume of a solution to which radiation light radiates and is measured, $i(\theta)$ represents efficiency of scattering in a $\theta$ direction with respect to energy of light received by one particle, Er represents light receiving efficiency (solid angle component) of scattered light, and $I_0$ represents radiation light quantity to a reaction solution, $I_{ideal}$ is expressed by Expression 2.

$$I_{idea} = n \cdot i(\theta) \cdot V \cdot Er \cdot I_0 \qquad \text{Expression 2}$$

On the other hand, the transmittance T is expressed by Expression 3, with Ls as an optical length to the scattered light receiver in a solution, and with A as the absorbance of a solution.

$$T = 10^{-A\frac{Ls}{10}} \qquad \text{Expression 3}$$

Expression 1 is expressed into Expression 4 from Expression 2 and Expression 3.

$$Is(\theta) = n \cdot i(\theta) \cdot V \cdot Er \cdot I_0 \cdot 10^{-A\frac{Ls}{10}}$$  Expression 4

By differentiating Expression 4, absorbance $A_1$ of a solution, in which a gradient is 0, and the maximum scattered light quantity is achieved, is obtained, and then $A_1$ is expressed by Expression 5.

$$A_1 = \frac{10}{Ls \cdot \ln 10} = 0.4343 \times \frac{10}{Ls}$$  Expression 5

From Expression 5, when the influence of multiple scattering is not considered, the maximum scattered light quantity is calculated at the absorbance of 0.8686 abs in the case where the optical length is 5 mm, for example. The optical length to the scattered light receiver in a solution is slightly longer than an optical length (optical length of a cell) because an angle is formed with respect to straightly traveling light; however, this is ignored here, and the optical length is assumed to be the same as the optical length of the cell. In addition, the absorbance of the solution, in which the maximum scattered light quantity is achieved, is calculated in the above computation; however, when the absorbance is considered as the transmittance, it is possible to calculate the absorbance as 1/e (≅transmittance of 36.8%).

Figure 4:
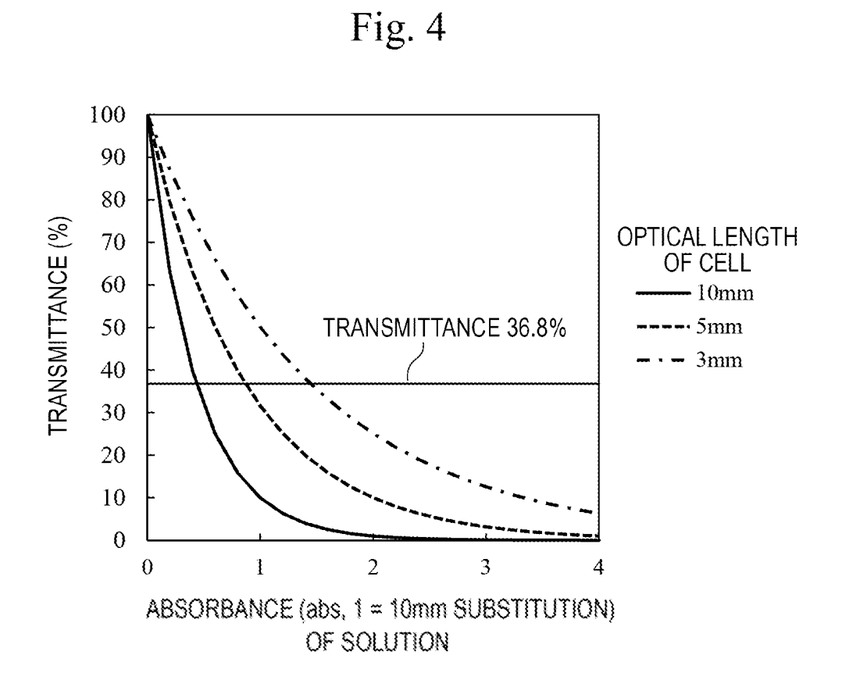
FIG. 4 is a graph showing a relationship between transmittance of a solution and absorbance of the solution for each optical length.

FIG. 4 is a graph showing a relationship between transmittance (%) and absorbance (substituted with that obtained at the optical length of 10 mm) of the solution for each of optical lengths of 10 mm, 5 mm, and 3 mm of the cell. Since the absorbance of the solution having the transmittance of 36.8% depends on the optical length passing through the solution, the absorbance of the solution having the maximum scattered light quantity changes when the optical length of the cell changes; however, computation results showing the maximum scattered light quantity at the transmittance of 36.8% do not change. For example, even when a light receiving angle of the scattered light is not 200 but 900, the same tendency of having the maximum scattered light quantity at 0.8686 abs is achieved when the optical length passing through the solution is 5 mm.

Figure 5:
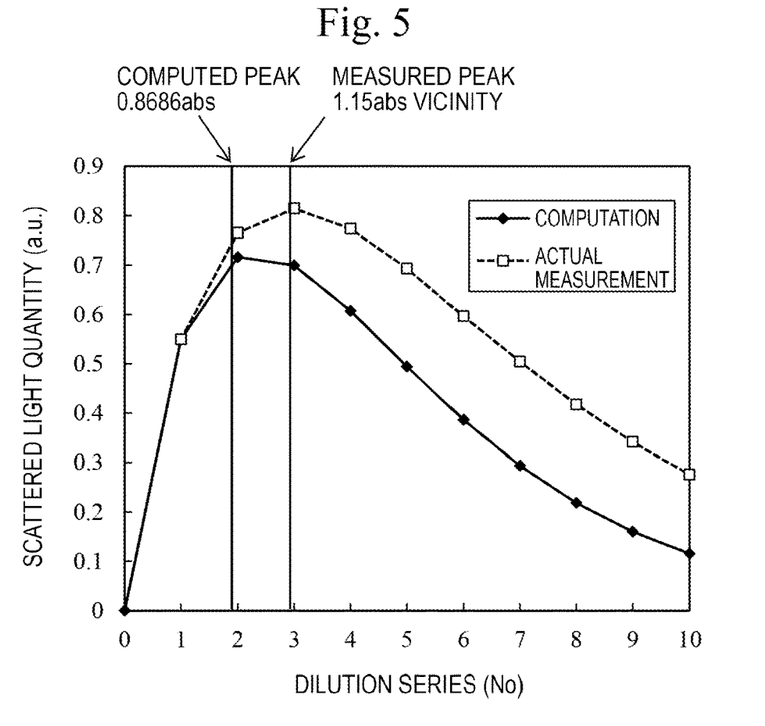
FIG. 5 is a graph comparing an experimental result to a computation result of the absorbance dependence of the scattered light quantity of the latex solution.

FIG. 5 is a graph comparing an experimental result to a calculation result when the grain size is 300 nm in FIG. 2. However, the vertical axis is normalized such that the same scattered light quantities from the experimental results (by actual measurement) and the computed results are obtained in a plot of dilution series No. 1.

In FIG. 5, deviation between the experimental results and the computed results may be due to the influence of the multiple scattering. A peak position, having the absorbance of 1.15 abs, is about 1.3 times larger than the computed value of 0.8686 abs. In actual measurement from FIGS. 2 and 5, a peak is found in the vicinity of substantially 1.15 abs, that is, in a range of 1.0 to 1.3 abs, regardless of the latex grain size. When about 0.8 to 1.5 abs is obtained from FIG. 2, the scattered light quantity does not have concentration dependence, and further the concentration dependence is small on a side of high concentration. Therefore, when the absorbance is practically 0.6 to 2.0 abs, it is possible to use the scattered light quantity with the small concentration dependence.

Figure 6:
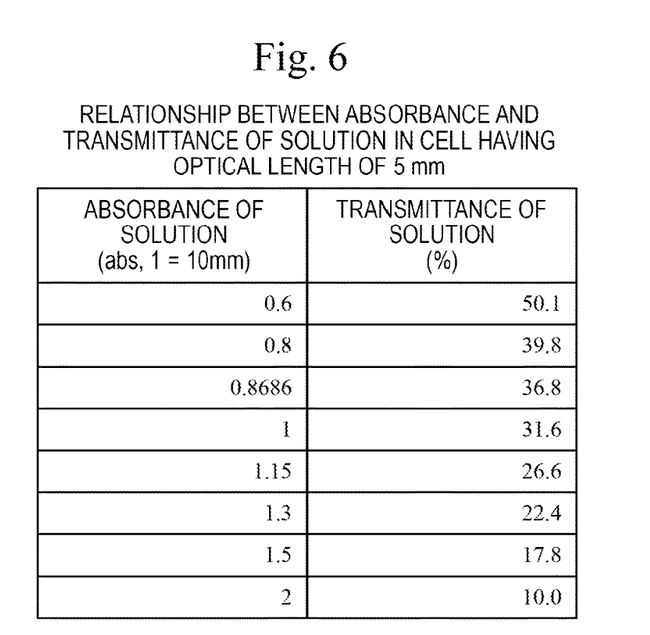
FIG. 6 is a table showing a relationship between absorbance and transmittance of a solution in a case of measurement in a cell having an optical length of 5 mm.

FIG. 6 is a table showing a relationship between the absorbance and the transmittance of a solution in the cell having the optical length of 5 mm. The absorbance is measured in the cell having the optical length of 5 mm, and an absorbance obtained by substituting the optical length with the optical length of 10 mm is shown. From FIG. 6, when the absorbance described above is substituted with the transmittance, it is preferable that the measurement can be practically performed in a range of the transmittance of 10% to 50%, it is preferable that the measurement can practically be performed in a range of the transmittance of 18% to 40% in order to be more accurate, and the measurement is performed with higher accuracy at the solution concentration, at which the transmittance is 22.4% to 31.6%. In this manner, it is possible to perform measurement in which the concentration dependence of the scattered light quantity is small and stable.

Figure 7:
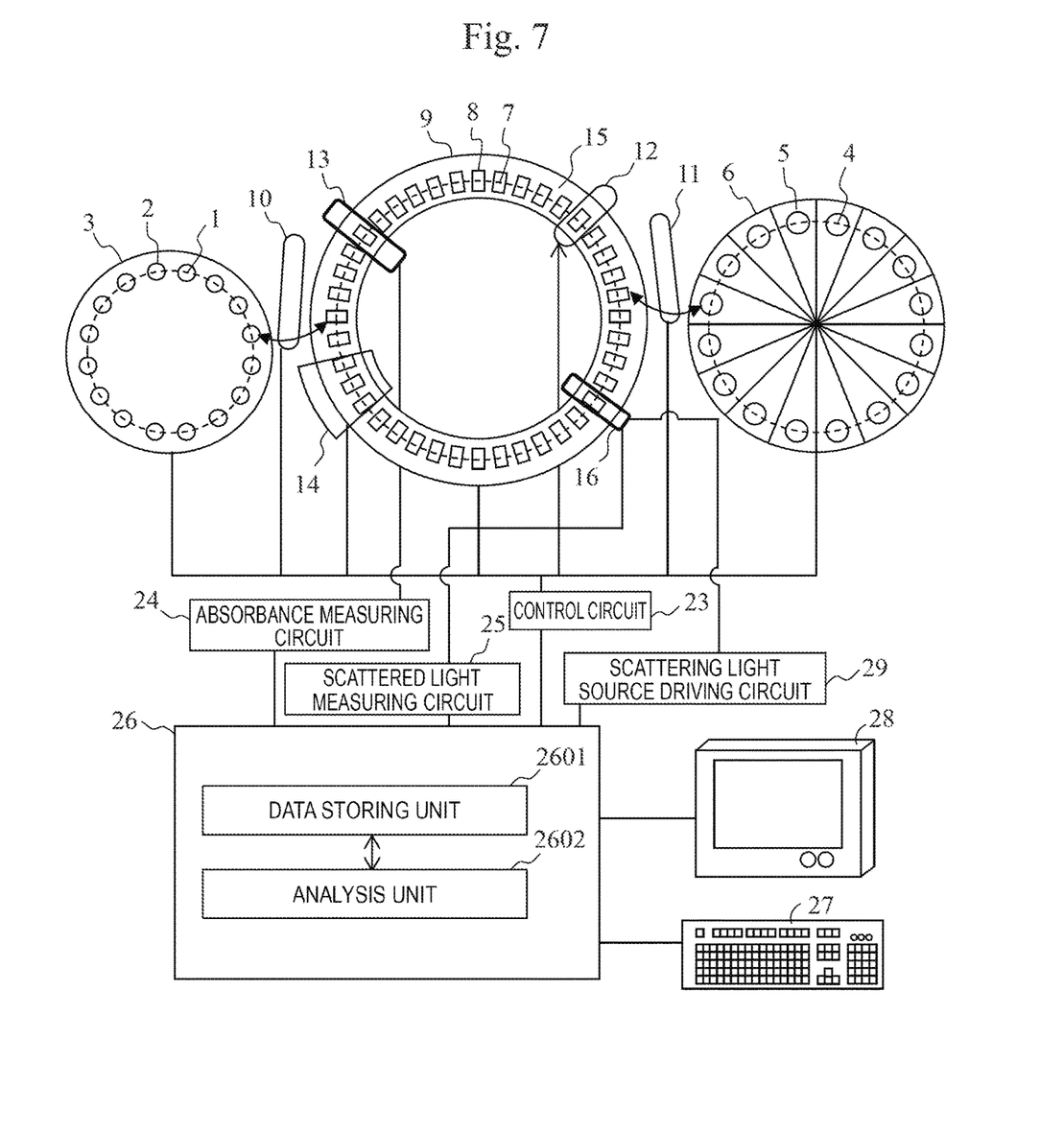
FIG. 7 is a schematic diagram showing an example of an entire configuration of an automated analyzer.

Next, a specific example of the automated analyzer will be described that measures scattered light of the solution and that quantifies the concentration of a substance to be measured in an analyte based on temporal change in the scattered light. FIG. 7 is a schematic diagram showing an example of an entire configuration of the automated analyzer of the example.

The automated analyzer according to the example includes a sample disk 3, a reagent disk 6, three types of disks of reaction disks 9, dispensing mechanisms 10 and 11 that causes the sample or the reagent to move between the disks, a control circuit 23 that controls the members, an absorbance measuring circuit 24 that measures the absorbance of a reaction solution, a scattered light measuring circuit 25 that measures scattered light from the reaction solution, a data processing unit 26 that processes data measured by the measurement circuits, an input unit 27 and an output unit 28 which are interfaces with the data processing unit 26, and a scattering light source driving circuit 29 that can adjust the quantity of a scattered light source. The data processing unit 26 has a data storing unit 2601 and an analysis unit 2602. The data storing unit 2601 stores control data, measurement data, data used in data analysis, analysis result data, and the like. The input unit 27 and the output unit 28 input and output data to and from the data storing unit 2601. In the example of FIG. 7, a case where the input unit 27 is a keyboard is shown; however, a touch panel, a ten key, an input device other than the examples above may be used.

A plurality of sample cups 2, which are containers of samples 1, are disposed on a circumference of a sample disk 3. For example, the sample 1 is blood. A plurality of reagent bottles 5, which are containers of reagents 4, are disposed on a circumference of a reagent disk 6. A plurality of the cells 8, which are containers of the reaction solution 7 obtained by mixing the sample 1 and the reagent 4, are disposed on a circumference of the reaction disk 9. A sample dispensing mechanism 10 is a mechanism that is used when the sample 1 is caused to move by a certain length to the cell 8 from the sample cup 2. For example, the sample dispensing mechanism 10 is configured to have nozzles that ejects or suctions a solution, a robot that positions and transports the nozzles at predetermined positions, and a pump that ejects the solution from the nozzles or suctions the solution into the nozzles. A reagent dispensing mechanism 11 is a mechanism that is used when the reagent 4 is caused to move by a certain length to the cell 8 from the reagent bottle 5. For example, the reagent dispensing mechanism 11 is also configured to have nozzles that ejects or suctions a solution, a robot that positions and transports the nozzles at predetermined positions, and a pump that ejects the solution from the nozzles or suctions the solution into the nozzles. An stirring unit 12 is a mechanical unit that stirs and mixes the sample 1 and the reagent 4 in the cell 8. A washing unit 14 is a mechanical unit that discharges the reaction solution 7 from the cell 8, in which the analysis process is ended, and then washes the cell 8. The next sample 1 is dispensed again from the sample dispensing mechanism 10 to the cells 8 after the washing is ended, and a new reagent 4 is dispensed from the reagent dispensing mechanism 11, and the sample and the reagent are used to a reaction process. In the reaction disk 9, the cell 8 is immersed in a constant-temperature fluid 15 in a constant-temperature thermostat bath of which a temperature and a flow rate is controlled the constant-temperature fluid 15 Therefore, the cell 8 and the reaction solution 7 in the cell have a temperature that is kept constant, even during movement thereof by the reaction disk 9. In a case of the example, water is used as the constant-temperature fluid 15, and the temperature is adjusted to 37±0.1° C. by the control circuit 23. It is needless to say that a medium, which is used as the constant-temperature fluid 15, and the temperature are an example. An absorbance measuring unit 13 and a scattered light measuring unit 16 are disposed in a part of the circumference of the reaction disk 9. The absorbance measuring unit 13 is also referred to as the absorptiometer, and the scattered light measuring unit 16 is also referred to as a scattered photometer.

Figure 8:
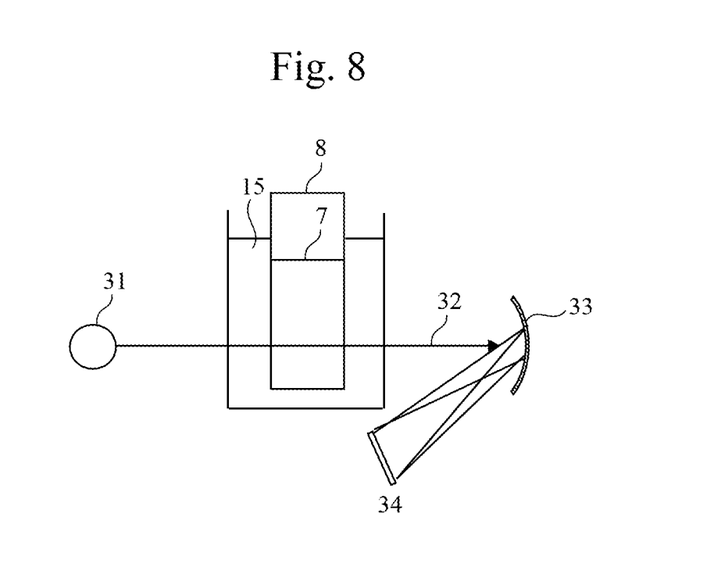
FIG. 8 is a schematic diagram showing an example of a configuration of an absorbance measuring unit.

FIG. 8 is a schematic diagram showing an example of a configuration of the absorbance measuring unit 13. The absorbance measuring unit 13 shown in FIG. 8 is configured to radiate light emitted from a halogen lamp light source 31 to the cell 8, to scatter light 32 transmitted from cell 8 by a diffraction grafting 33, and to receive a photodiode array 34. Examples of wavelengths that are received by the photodiode array 34 include 340 nm, 405 nm, 450 nm, 480 nm, 505 nm, 546 nm, 570 nm, 600 nm, 660 nm, 700 nm, 750 nm, and 800 nm. A reception signal received by a light receiver is transmitted to the data storing unit 2601 of the data processing unit 26 through the absorbance measuring circuit 24. Here, the absorbance measuring circuit 24 acquires a reception signal of wavelength region at regular intervals and outputs an acquired light quantity value to the data processing unit 26.

Figure 9:
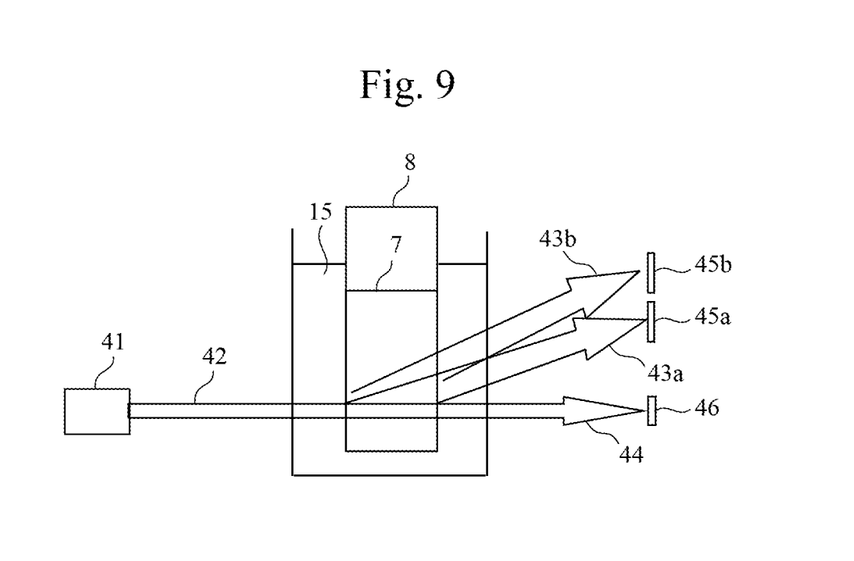
FIG. 9 is a schematic diagram showing an example of a configuration of a scattered light measuring unit.

FIG. 9 is a schematic diagram showing an example of a configuration of the scattered light measuring unit 16. In the case of this example, an LED light source unit is used as the light source 41. Radiation light 42 emitted from the LED light source unit radiates to the cell 8 that is positioned on an optical path, and the transmitted light 44 transmitted through the cell 8 is received by the transmitted light receiver 46. For example, the radiation light having a wavelength of 700 nm is used. In the example, the LED light source unit is used as the light source 41; however, a laser light source, a xenon lamp, a halogen lamp, or the like may be used.

The scattered light measuring unit 16 receives scattered light 43*a* in a direction, which is separated from an optical axis of the radiation light 42 or the transmitted light 44 by an angle of 20° in the air, by a scattered light receiver 45*a*. In addition, the scattered light measuring unit 16 receives scattered light 43*b* in a direction, which is separated from the optical axis of the radiation light 42 or the transmitted light 44 by an angle of 30° in the air, by a scattered light receiver 45*b*. For example, the scattered light receivers 45*a* and 45*b* are configured to have a photodiode. A reception signal received by the scattered light receivers 45*a* and 45*b* is transmitted to the data storing unit 2601 of the data processing unit 26 through the scattered light measuring circuit 25. Here, the scattered light measuring circuit 25 acquires two reception signals having different light receiving angles at regular intervals and outputs an acquired light quantity value to the data processing unit 26.

The scattered light receivers 45*a* and 45*b* are disposed in a plane which is generally vertical with respect to a moving direction of the cell 8 in association with rotation of the reaction disk 9. Here, a reference position (starting point of scattering) of a light receiving angle is set at the central portion of an optical path of light passing through the cell 8.

In FIG. 9, a case is described where the scattered light receivers 45*a* and 45*b* are disposed to correspond to light receiving angles 20° and 30°, respectively. However, a configuration may be employed wherein a single linear array having multiple light receivers is disposed, and wherein scattered light at a plurality of angles is received at once. The use of the linear array enables choices of light receiving angles to increase. In addition, an optical system such as fiber or lens may be disposed, without the light receiver, and light may be guided to the scattered light receiver disposed at a separate position. In addition, one scattered light receiver may be provided.

The concentration of the substance to be measured, which is contained in the analyte (sample) 1 is quantified in accordance with the following procedure. First, the control circuit 23 drives a washing unit 14 and washes the cell 8. Next, the control circuit 23 drives the sample dispensing mechanism 10 and dispenses the sample 1 in the sample cup 2 to the cell 8 by a constant amount. Next, the control circuit 23 drives the reagent dispensing mechanism 11 and dispenses the reagent 4 in the reagent bottle 5 to the cell 8 by a certain amount. When the solution is dispensed, the control circuit 23 rotatably drives the sample disk 3, the reagent disk 6, and the reaction disk 9 by a driving unit corresponding to each. At this time, the sample cup 2, the reagent bottle 5, and the cell 8 are positioned at predetermined dispensing positions depending on a drive timing of the corresponding dispensing mechanism, respectively. Subsequently, the control circuit 23 controls the stirring unit 12 to stir the sample 1 and the reagent 4 dispensed into the cell 8, thereby generating the reaction solution 7. The rotation of the reaction disk 9 causes the cell 8 that contains the reaction solution 7 to pass through a measurement position, at which the absorbance measuring unit 13 is disposed, and a measurement position, at which the scattered light measuring unit 16 is disposed. Whenever the cell 8 passes through the measurement position, the transmitted light or the scattered light from the reaction solution 7 is measured by the corresponding absorbance measuring unit 13 or scattered light measuring unit 16. In the case of the example, every measurement time is about ten minutes. Measurement data obtained by the absorbance measuring unit 13 and the scattered light measuring unit 16 is output to the data storing unit 2601 in order and is accumulated as reaction process data.

While the reaction process data is accumulated, another reagent 4 is added and dispensed to the cell 8 by the reagent dispensing mechanism 11, is stirred by the stirring unit 12, and is further measured for a certain time, if necessary. In this manner, the reaction process data acquired at constant time intervals is stored in the data storing unit 2601.

The concentration determination is calculated from the reaction process data accumulated in the data storing unit 2601 at a scattering angle of the scattered light receiver 45*a* or the scattered light receiver 45*b* selected by a user in advance. Either one of the scatter light receiver is designated for each measurement item.

Figure 10:
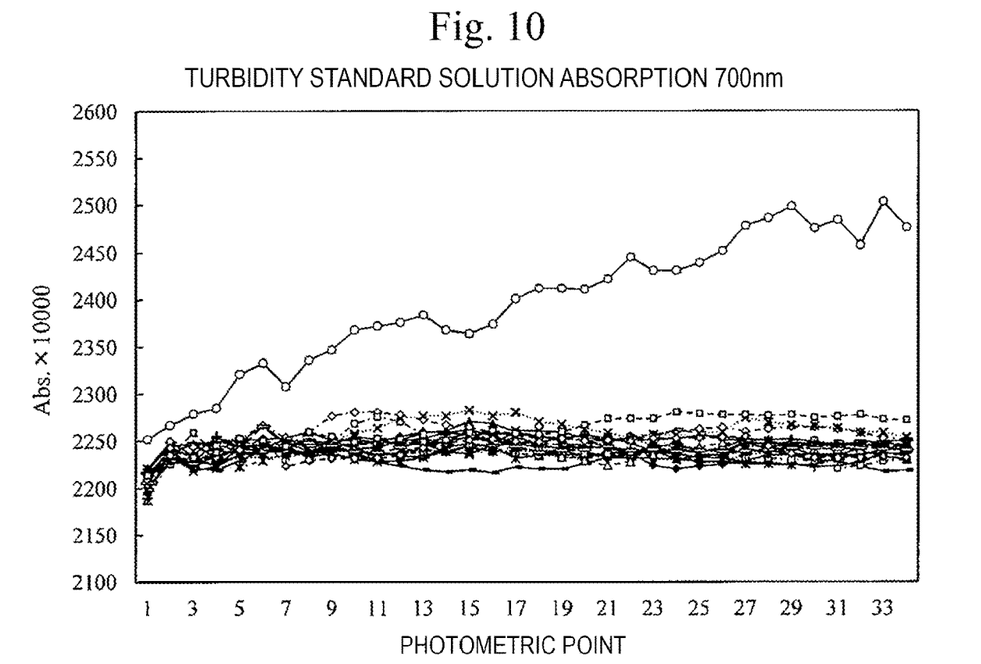
FIG. 10 is a graph showing data obtained by measuring a turbidity standard solution by an absorptiometer.
Figure 11:
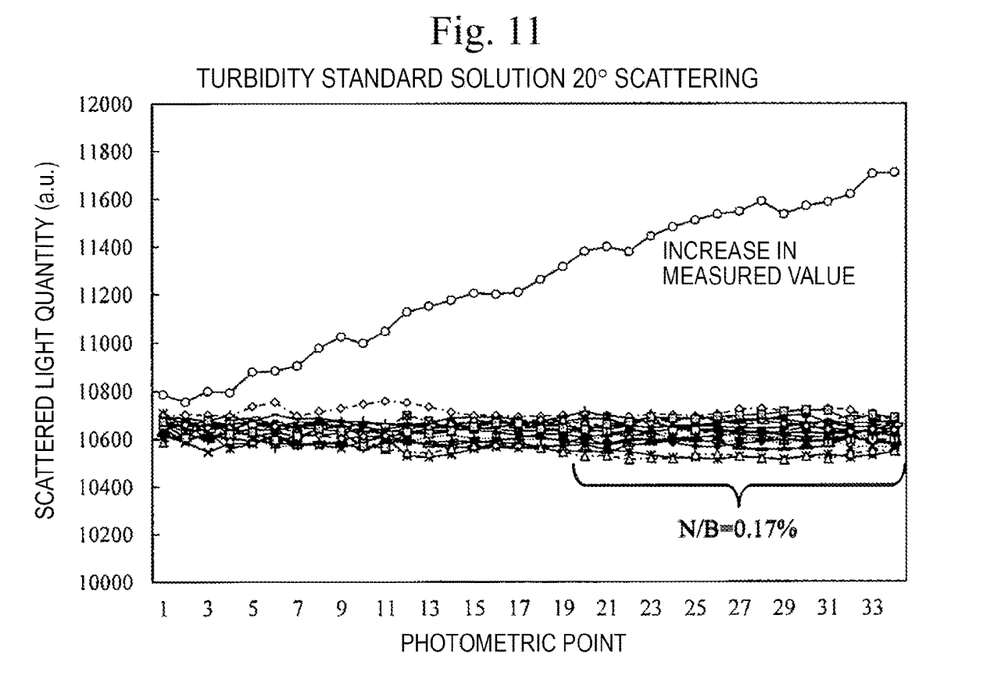
FIG. 11 is a graph showing data obtained by measuring the turbidity standard solution by a scattered photometer.

FIG. 10 is a graph showing data measured by the absorbance measuring unit 13 at a cell position by an analysis operation on the apparatus by installing a solution of 100-degree turbidity standard solution as the analyte reagent on the automated analyzer. A composition of the 100-degree turbidity standard solution is a mixture of particles having a grain size of 0.5 µm, 1.0 µm, 2.0 µm, 5.0 µm, and 10.0 µm, and the absorbance of the solution is about 0.22 abs. The transmittance of the solution is 77.6% in the cell having the optical length of 5 mm. Photometric points represented by the horizontal axis in FIG. 10 indicate an order in which the reaction process data is measured, and it takes about ten minutes from the first point to the thirty-fourth point. The vertical axis of FIG. 10 represents the absorbance measured by the absorbance measuring circuit 24. In addition, FIG. 11 is a graph showing measured results of the same solution by the scattered light measuring unit 16. The vertical axis of FIG. 11 represents the scattered light quantity measured by the scattered light measuring circuit 25.

The measurement performed on 20 cells is overwritten in each of FIGS. 10 and 11; however, one measured value increases as time elapses in one measurement, and are drifted. This may be because bubbles attached on a wall surface of the cell grows, and thus the scattered light quantity increases. In addition, fluctuation of measurement values from the result of scattered light measurement in FIG. 11 is calculated as a noise rate (N/B) in a reaction process obtained by dividing a standard deviation (N) of measured data of the photometric points 20 to 34 by an average value (B). The calculated N/B is 0.17%. It is preferable that it is possible to perform photometry with high accuracy when the noise rate (N/B) in the reaction process is low, and reproducibility is improved.

Figure 12:
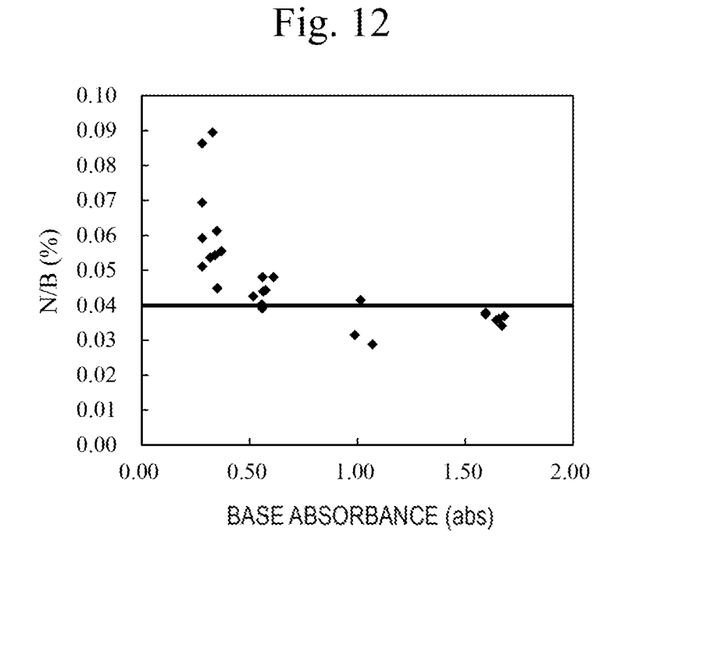
FIG. 12 is a graph showing absorbance dependence of fluctuation of scattered light of a commercially available latex reagent.

In the automated analyzer of the example, physiological saline is used as the analyte, commercially available latex reagent is mixed therein, and the noise rate N/B (%) of the reaction process data obtained through the photometry performed by the scattered light measuring unit 16 in a state in which reaction does not occur is calculated. FIG. 12 is a graph showing plotted data in which the horizontal axis represents the absorbance. It is found that the higher the base absorbance, that is, the absorbance before reaction occurs, from FIG. 12, the lower the N/B. When the absorbance is about 0.6 to 2.0 abs, N/B is 0.04% or lower, the fluctuation in the measured values is decreased, and thus it is found that it is possible to perform the photometry with high accuracy. An effect of reducing such fixed noise components by increasing the concentration is achieved, and an influence of uneven concentration of the particles in a measurement volume due to convection or the like is suggested to be reduced in the vicinity of the peak position of the scattered light in FIG. 2 in which the concentration dependence of the scattered light quantity is lower. Thus, the minimum fluctuation of the measured values is found.

In the example, as the standard solution for evaluating the scattered light measuring optical system of the automated analyzer, the latex solution having the absorbance of 1.13 abs, which contains latex particles having a grain size of 300 nm as an insoluble carrier, is used. In a solvent in which the latex particles having the specific gravity of 1.05 are dispersed as the insoluble carriers, a glycerin aqueous solution containing 20% by weight of glycerin having the specific gravity of 1.26 is used as a specific gravity adjusting solution. The specific gravity adjusting solution is used such that the specific gravity of the solvent, in which the insoluble carriers are dispersed, is substantially equal to the specific gravity of the insoluble carrier. For example, the specific gravities of both of the solvent and the insoluble carrier are almost equal as the specific gravity of the solvent and the specific gravity of the insoluble carrier is ±25% or lower, and thereby it is possible to prevent the insoluble carrier from being deposited as sediment in the standard solution. Specifically, even when an aqueous solution containing 15% to 25% by weight of glycerin is used as the solvent in which the latex particle are dispersed, it is possible to obtain substantially equal specific gravity to that of polystyrene that is a material of the latex particles, and deposition suppressing effect of the latex particles is achieved. In addition, TritonX-100 is mixed by 0.5% as a surfactant. The surfactant is mixed into the standard solution, and thereby it is possible to improve wettability of the wall surface of the cell, it is possible to suppress the light quantity change due to the growth of bubbles after the solution is dispensed into the cell, and it is possible to perform stable scattered light photometry.

Figure 13:
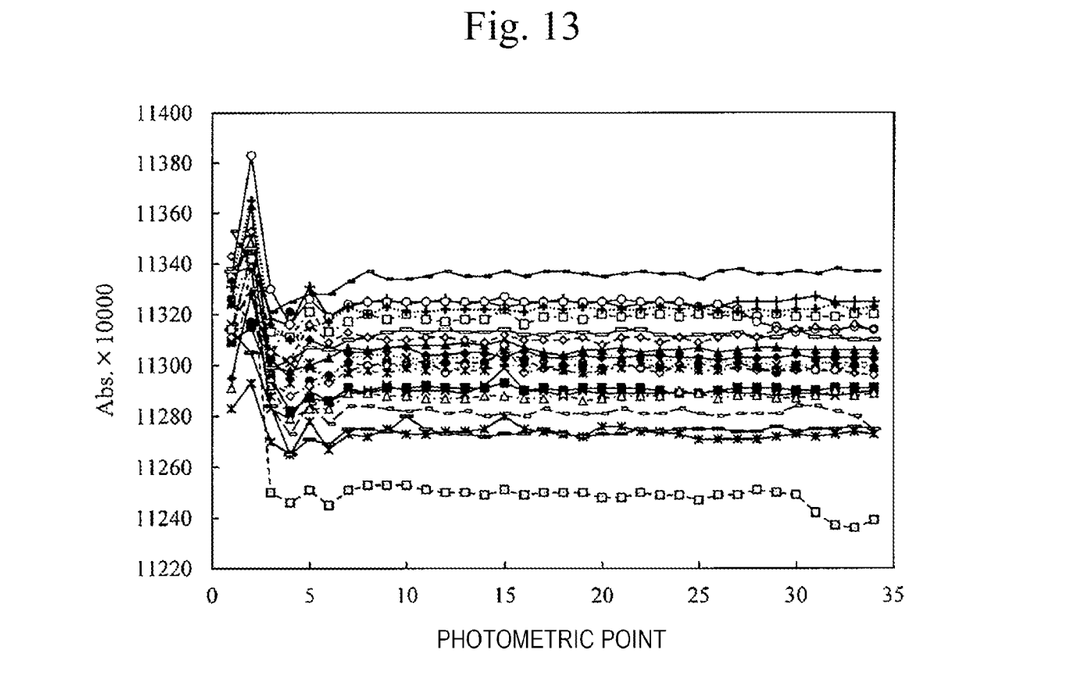
FIG. 13 is a graph showing results obtained by measuring a standard solution for evaluating an optical system by the absorbance measuring unit.
Figure 14:
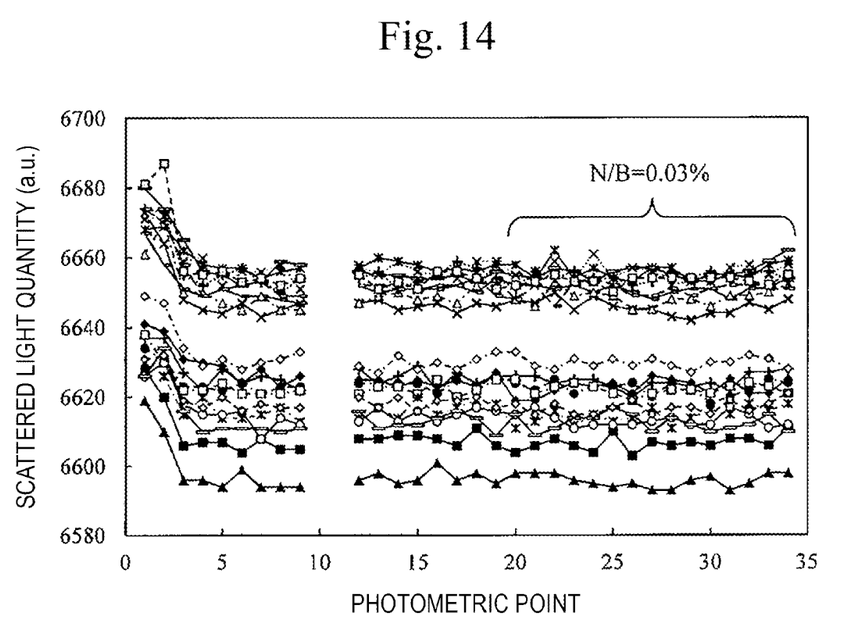
FIG. 14 is a graph showing results obtained by measuring the standard solution for evaluating the optical system by the scattered light measuring unit.

FIG. 13 is a graph showing measured results by the absorbance measuring unit 13 after the standard solution for evaluating the scattered light measuring optical system is dispensed into the cell 8. FIG. 14 is a graph showing measured results by the scattered light measuring unit 16 after the standard solution for evaluating the scattered light measuring optical system is dispensed into the cell 8. Since the surfactant is mixed in the standard solution in both examples, there are no bubbles attached and growing on the wall surface of the cell, and thus no drift in the measured values are found. In addition, N/B obtained from the measured data of photometric points 20 to 34 is found to be reduced to 0.03%. In this manner, when the standard solution of the example is used, it is found to be able to evaluate the optical system with high accuracy without the influence of uneven concentration of the insoluble carrier particles. Output changes found at the first several photometric points in FIGS. 13 and 14 are output changes due to the dispensing and stirring.

When the solution is dispensed to the cell, the concentration of the insoluble carriers such as the latex particles contained in the standard solution may be preferably a concentration at which the absorbance is 0.6 to 2.0 abs or a concentration at which the transmittance is in a range of 10% to 50%, more preferably, a concentration at which the absorbance is 0.8 to 1.5 abs or a concentration at which the transmittance is in a range of 18% to 40% and, still further preferably, the concentration at which the absorbance is 1.0 to 1.3 abs or a concentration at which the transmittance is in a range of 22.4% to 31.6%. In addition, the grain size of the latex particles is preferably 250 to 350 nm.

Figure 15:
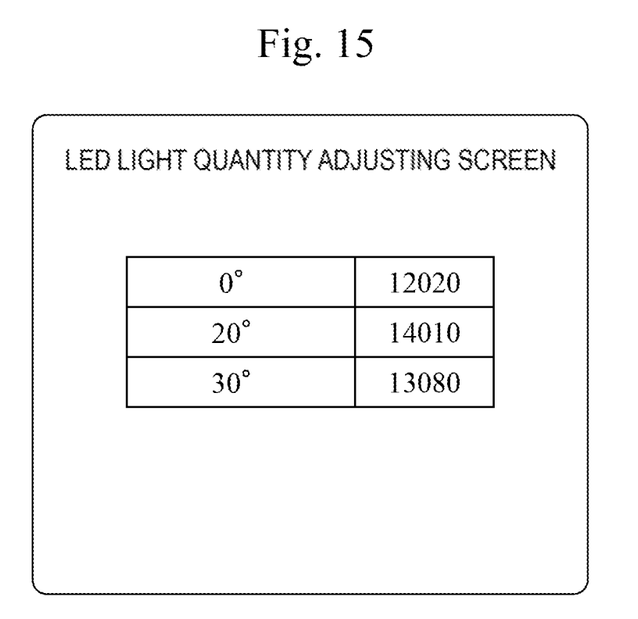
FIG. 15 is a schematic diagram showing an example of an LED light quantity adjusting screen for adjusting a light quantity.

FIG. 15 is a schematic diagram showing an example of an LED light quantity adjusting screen for adjusting light quantity displayed on the output unit 28. The automated analyzer of the example has a light source light quantity adjusting mode, in addition to a normal analyzing mode, and the LED light quantity adjusting screen shown in FIG. 15 is displayed when the adjustment mode is selected.

In the light source light quantity adjusting mode, the standard solution for evaluating the scattered light measuring optical system, that is, the standard solution containing the insoluble carriers at the concentration at which the absorbance is 0.6 to 2.0 abs or at the concentration at which the transmittance is in the range of 10% to 50%, when the solution is dispensed to the cell, is dispensed to the cell that contains the reaction solution of the automated analyzer. The light radiates from the light source to the cell to which the standard solution is dispensed, the light scattered by the standard solution in the cell is detected by the scattered light detector, and the light quantity of the light source is adjusted such that the scattered light detector outputs the predetermined value.

In the LED light quantity adjusting screen of the example, a value obtained by adding a base count (value obtained when the light quantity is 0) 6667, which is a fixed value on a circuit, to the light quantity received by the transmitted light receiver 46 and the scattered light receivers 45a and 45b of the scattered light measuring unit 16, is digitally displayed. In a case where evaluating latex solution having the grain size of 300 nm and the concentration of 1.13 abs was measured, an LED driving current value of the scattering light source driving circuit 29 is adjusted such that an output value of an ADC circuit is 14000±100 at the scattering angle of 20°. It is possible to achieve the adjustment of the LED driving current value by automatically performing the adjustment from the analyzer screen by using software, and it is advantageous in that it is easy to perform change in this case.

Figure 16:
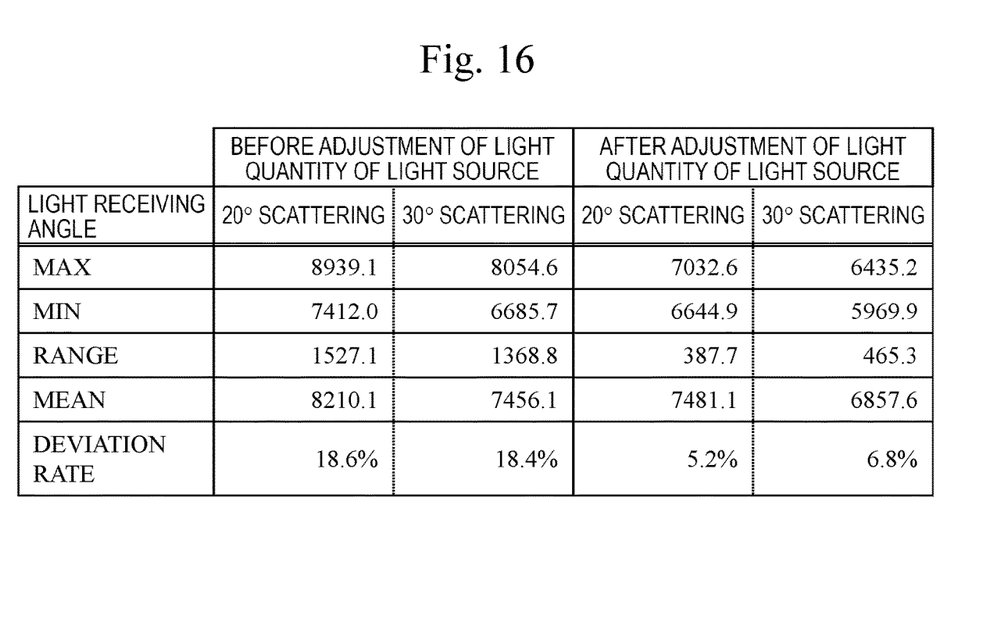
FIG. 16 is a table showing an evaluation result of variations in measured values between analyzers.

FIG. 16 is a table showing values of scattered light quantity at the scattering angles of 20° and 30° before and after the light quantity of the light source is adjusted in three automated analyzer having the same configuration as that used in the example. A deviation rate ((MAX−MIN)/MIN× 100(%)) was about 18% and fluctuated before the light quantity of the light source was adjusted; however, it was possible to suppress the deviation rate to about 6% by adjusting the light quantity. The light quantity is adjusted such that the output value is ±2% or lower by using the scattered light receiver having an angle of 20°. The sensitivity of the light receiver installed fluctuated or the like for each light receiving angle. Therefore, although it was not possible to obtain perfectly equal light quantities, it was possible to reduce the fluctuation of the light quantities. As described above, during shipping of the automated analyzer using the standard solution of the example or during replacement of a light source, the light quantity of the LED used as a light source is adjusted, and thereby it is possible to reduce differences between analyzers during the shipping or during the replacement of the light source.

In addition, in the example, the latex particles having a grain size of 300 nm are used as the insoluble carriers. However, when particles having a grain size of 250 nm to 350 nm are used, it is preferable that the grain size is equal to that of the latex reagent which is measured on the automated analyzer, and the scattered light quantities are likely to be the same.

Figure 17:
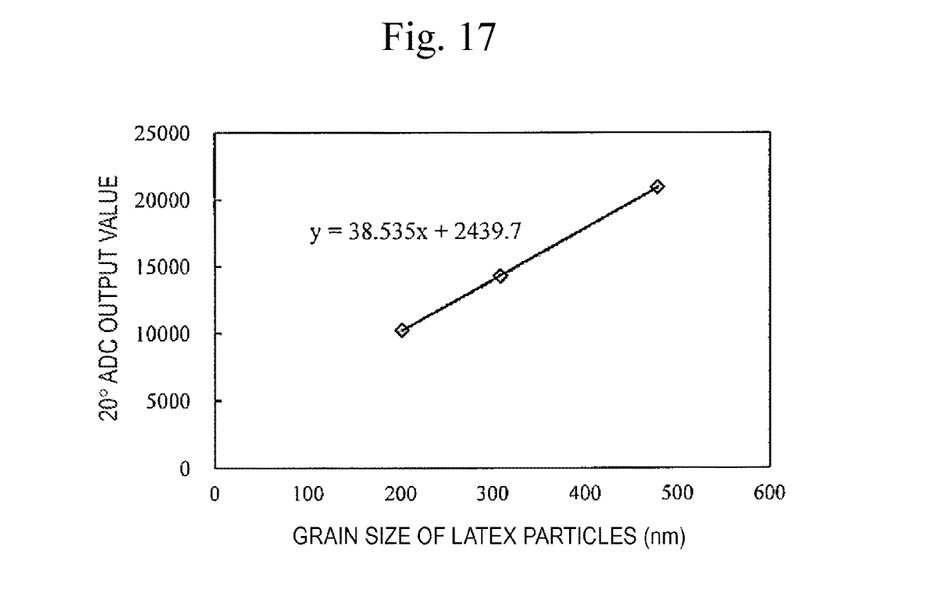
FIG. 17 is a graph showing a relationship between a grain size of the latex particles and an output from a scattered light receiver.

If a difference in the scattered light quantity is measured in advance by using a difference in the grain size, and also if a relationship between the grain size and the scattered light quantity is known, it is also possible to take action by correcting a difference between lots of the latex particles having a grain size that changes minutely. FIG. 17 is a graph showing a relationship between a grain size of the latex particles and an ADC output value of a signal from the scattered light receiver. When the LED driving current is changed and the ADC output value is set to 14385 in a case where the grain size of the latex particles is 310 nm, it is found that setting of the ADC output value 14000 results in the same when the grain size is 300 nm. In addition, in the example, the LED driving current is adjusted and a difference between the analyzers is eliminated; however, there can be no difference between analyzers by correcting an amplification magnification or the like of a circuit.

The present invention is not limited to the examples described above and includes various modification examples. For example, the examples above are described in detail for easy understanding of the present invention, and the present invention is not absolutely limited to inclusion of the entire configuration described above. In addition, it is possible to replace a part of a configuration of an example with a configuration of another example, and it is possible to add a configuration of an example to a configuration of another example. In addition, it is possible to perform addition, removal and replacement of a part of each of the configurations of the examples to, from and with another configuration.

REFERENCE SIGNS LIST

2: sample cup
3: sample disk
5: reagent bottle
6: reagent disk
8: cell
9: reaction disk
13: absorbance measuring unit
16: scattered light measuring unit
26: data processing unit

The invention claimed is:

1. A method of adjusting a light quantity of a light source, comprising:
providing an automated analyzer that has an LED light source, a cell that contains a reaction solution, and a detector that detects light which radiates from the light source to the cell and is scattered by the reaction solution in the cell, the cell having an optical path of 5 mm;
irradiating the cell with the light source light with a quantity of light at a wavelength of 700 nm;
dispensing a standard solution to the cell, the standard solution comprising a solvent and an insoluble carrier at a concentration at which transmittance is in a range of 10% to 50% at an optical length of 5 mm in the cell, wherein
the insoluble carrier is a latex particle having a grain size of 250 to 350 nm;
detecting, by the detector, light which radiates from the light source to the cell, to which the standard solution is dispensed, and is scattered by the standard solution in the cell as a light quantity received, wherein
the solvent in the standard solution is a glycerin aqueous solution containing 15% to 25% by weight of glycerin;
adjusting the light quantity of the light source such that the detector outputs a predetermined value, wherein the method to adjust the light quantity comprises determining the predetermined value based on the grain size and concentration of the standard solution,
measuring the light quantity received by the detector,
retrieving a stored preset base count light quantity from a circuit obtained when the light quantity received was 0,
determining a light detector output value by adding the base count light quantity to the light quantity received, and
adjusting the quantity of light emitted by the light source by controlling a driving current of the LED such that the light detector output value is equal to the predetermined value.

2. The method according to claim 1, wherein the standard solution further comprises a surfactant.

3. The method according to claim 1, wherein the solvent is used as a specific gravity adjusting solution and the standard solution has a specific gravity that is within +/−25% of a specific gravity of the insoluble carrier.

\* \* \* \* \*